United States Patent
Young et al.

(10) Patent No.: US 7,043,290 B2
(45) Date of Patent: May 9, 2006

(54) METHOD AND APPARATUS FOR SEGMENTATION OF AN OBJECT

(75) Inventors: Stewart Young, Hamburg (DE); Vladimir Pekar, Hamburg (DE); Juergen Weese, Aachen (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 10/235,430

(22) Filed: Sep. 5, 2002

(65) Prior Publication Data

US 2003/0056799 A1 Mar. 27, 2003

(30) Foreign Application Priority Data

Sep. 6, 2001 (EP) ................... 01121319

(51) Int. Cl.
*A61B 5/05* (2006.01)
(52) U.S. Cl. .............. 600/416; 600/407; 600/410; 382/173
(58) Field of Classification Search ........... 600/407, 600/410, 416; 382/128, 130, 131, 133, 294, 382/154, 171, 172, 173, 260, 261, 270, 272; 324/300–309; 364/413–418
See application file for complete search history.

(56) References Cited

U.S. PATENT DOCUMENTS

| | | | | |
|---|---|---|---|---|
| 5,204,625 | A * | 4/1993 | Cline et al. | 324/306 |
| 5,768,405 | A * | 6/1998 | Makram-Ebeid | 382/128 |
| 5,903,664 | A * | 5/1999 | Hartley et al. | 382/154 |
| 2001/0031920 | A1* | 10/2001 | Kaufman et al. | 600/431 |
| 2003/0031351 | A1* | 2/2003 | Yim | 382/130 |
| 2004/0091143 | A1* | 5/2004 | Hu | 382/154 |

OTHER PUBLICATIONS

"Model-based quantitation of 3D magnetic resonance angiogrphic images", A. Frangi et al., IEEE Transactions on medical imaging, vol. 18, No. 10, Oct. 1999.

Kwang-Man Oh, et al.; A Segmentation and Abstraction of Blood Vessels from Volume Data for Surgical Simulation; Int. Conf. on Artificial Reality and Telexitence, ICAT '99; Dec., 1999, pp. 92-97.

Ostergaard, L.R., et al.; Knowledge-Based Extraction of Cerebral Vasculature from Anatomical MRI; Medical Imaging 2001:Image Processing; Feb. 2001; pp. 170-183.

Delibasis, K.K., et al.; MR Functional Cardiac Imaging: Segmentation, Measurement and WWW Based Visualisation of 4D Data; Future Generations Computer Systems, Elsevier Science Publishers; Mar. 1999; pp. 185-193, Amsterdam, NL.

Zerroug, M., et al.; Segmentation and 3-D Recovery of Curved-Axis Generalized Cylinders from an Intensity Image; Pattern Recognition, 1994, pp. 678-681, IEEE Comput. Soc.; Los Alamitos, CA.

* cited by examiner

*Primary Examiner*—Brian L. Casler
*Assistant Examiner*—William Jung
(74) *Attorney, Agent, or Firm*—Fay, Sharpe, Fagan, Minnich & McKee (57) ABSTRACT

An object, such as an example blood vessel, in a two or three dimensional image data set is segmented. An adaptable model, such as an example cylinder model, is defined around a starting point in the example blood vessel and is adapted or fit to the blood vessel. A plurality of candidate next active points are defined around the starting point and the adaptable model is defined around each candidate point. The models around the candidate points are adapted to the blood vessel. Based on results of the fitted models, a next active point is selected. In this manner, the blood vessel is segmented by adapting a series of cylinder models to an inner surface of the blood vessel.

19 Claims, 6 Drawing Sheets

METHOD AND APPARATUS FOR SEGMENTATION OF AN OBJECT

BACKGROUND

The invention relates to a method and an apparatus for segmentation of an object in a 2D or 3D image data set by extracting a path along the object in a selected region. Further, the invention relates to a computer program product.

Magnetic resonance angiography (MRA) images provide important information for the diagnosis of vascular disease, such as arterial stenosis and aneurysm. The recent development of MR blood-pool contrast agents which have extended intravascular half-life allows the acquisition of high resolution, high contrast 3D images of the vascular system.

The visualization of the vessel pathways is crucial to allow quick and reliable assessment of any potential problems. The most common visualization method is to construct a maximum intensity projection (MIP). However, with blood-pool contrast agents, the longer scan times necessary to achieve higher resolution require imaging during the steady state of contrast agent diffusion. Therefore, both arteries and veins are enhanced, and diagnostically important information (typically the arteries, where stenosis occurs) may be fully or partially occluded in the MIP.

Several approaches have been made for selecting voxels belonging to vessel regions. A wide spread approach for vessel enhancement is to use multi-scale orientation selective filters, based on eigen-analysis of the Hessian matrix, as e.g. known from "Model-based quantitation of 3D magnetic resonance angiographic images", A. Frangi et al., IEEE Transactions on medical imaging, Vol. 18, No. 10, October 1999. Therein, linear vessel segments are modeled with a central vessel axis curve coupled to a vessel wall surface. The path is initialized using the shortest path across an image iso-surface. However, a significant limitation of filter-based approaches for vessel selection is that not all those voxels required to define a vessel structure fulfil the filter criteria, in particular those pixels near structural bifurcations. On the other hand, pixels not belonging to vessels may also be selected with filtering based approaches, for example in regions between two nearby vessel structures.

Also for the visualization of other objects, particularly anatomical structures like bones or airways in medical image data sets and also in 2D image data sets like images of the vessel tree, a method for segmentation of an object is often applied. It is thus an object of the present application to provide a method and an apparatus for accurately and automatically segmenting an object in an image data set.

This object is achieved by a method for segmentation comprising:
a) selecting a start point of the path as first active point,
b) adapting an adaptable model to the object in a first active section around the start point,
c) finding the next point of the selected region by the steps of:
   c1) copying the geometric model parameters of the adapted model of the active point to a plurality of neighboring points of the active point,
   c2) orienting a model around each of said plurality of neighboring points using said copied model parameters and searching the closest object points around each of said neighboring points based on said model,
   c3) adapting the models to the found object points for each neighboring point,
   c4) selecting the neighboring point for which the adapted model fits best to the object as next point of the selected region and as next active point, and
d) repeating step c) until an end point of the path or a predetermined number of iterations is reached.

According to one aspect, the user selects a start point as first action point in a first active region of the selected region in which the path shall be extracted. Preferably, also an end point is selected. Thus, the object of interest is identified which is then automatically segmented so that it can be suppressed from an image if required. For said segmentation prioritized region growing is used wherein iteratively voxels/pixels are added to a selected region based on a model adaptation and a selection for which point the model fits best to the object. The method according to the invention thus includes an iterative algorithm for finding the points of the path along the object during which the model, which ahs been adapted around a previous point of the path, is first copied to all neighboring points. Thereafter, for each neighboring point the models are adapted to the object by finding the closest object points. Based on the selection which model of which neighboring point fits best to the object the next point of the path from said neighboring points is selected.

During said prioritized region growing geometric model parameters, e.g. the radius, or cross-section parameters of the model, are propagated to neighboring points not yet having parameter estimates. In the first step, this means all the neighbors, but in subsequent steps, some of the neighbors will already have parameter estimates.

By the method, the boundary of the object can be accurately identified. Further, since particularly in vascular images venous and arterial pathways are often close together, it is possible, via the use of an appropriate geometric model, to discriminate between very closely separated structures, so that only anatomically connected pathways are selected. Further, the method is able to detect objects across a range of scales, which is important since the width of objects like vessels or airways can vary significantly.

Preferred embodiments are included in the dependent claims. The object is also achieved by an apparatus for segmentation comprising:
a) start point selection means for selecting a start point of the path as first active point,
b) first adaptation means for adapting an adaptable model to the object in a first active section around the start point,
c) path extracting means for finding the next point of the selected region by the steps of:
   c1) copy means for copying the geometric model parameters of the adapted model of the active point to a plurality of neighboring points of the active point,
   c2) search means for orienting a model around each of said plurality of neighboring points using said copied model parameters and for searching the closest object points around each of said neighboring points based on said model,
   c3) second adaptation means for adapting the models to the found object points for each neighboring point,
   c4) neighbor selection means for selecting the neighboring point for which the adapted model fits best to the object as next point of the selected region and as next active point, and
d) control means for repeating step c) until an end point of the path or a predetermined number of iterations is reached.

The application relates further to an apparatus for acquiring and processing medical image data, in particular a magnetic resonance apparatus, a computer tomography apparatus, an x-ray apparatus or an ultrasound apparatus, comprising means for acquiring medical image data and means for processing said image data including an apparatus for segmentation. Still further, the application relates to a computer program product comprising computer program means for causing a computer to perform the claimed steps when said computer program product is run on a computer. It shall be understood that these apparatuses and said computer program product can be developed further and can have similar embodiments as included in the claims.

For the selection which model fits best to the object, i.e. which of the neighboring points is the next point of the path, a distance measure is used based on the distances between the object and the model. Therefore, the distances along the normals from the surface of the model to the found object points are formed, and the distances along said normals are processed to form a distance measure for each model. This distance measure is combined with a gradient measure (sum of gradient across cylinder surface), and the model having the minimum combined measure is selected. The corresponding neighboring point will be selected as next point to be added to the selected region.

In order to find object points in the image data set that are closest to the models around the new neighboring points gradients of image values in the image data set are used. Particularly in medical images objects like vessels or airways show a high gradient at their borders compared to the gradient of the grey values of surrounding tissue.

In general, the present technique can also be used to segment a surface. Therefore, the surface is extracted by using planes along the surface as adaptable models and by adapting the planes to the surface.

A preferred application lies, as explained above, in the field of segmentation of objects in medical images. Preferably, tubular objects like vessels, bones and airways can be segmented in 3D medical image data sets. The start point is then selected within the tubular object, and the path within the object can be extracted, the path following mainly the centerline of the tubular object.

In general, any kind of three-dimensional model can be used when segmenting an object in a 3D image data set. When applying the present technique for segmentation of tubular objects, cylinder models have been shown useful the cross section of said cylinders being either circular, elliptical or even more close to the cross section of the tubular object to be segmented.

When using such cylinder models, in the first step of region growing, when parameters of the cylinder model are copied to all neighboring points of the previous point of the path, preferably the orientation and the radius of the cylinder model is copied to each neighboring point so that identical cylinder models are located around each neighboring point. After finding the closest object points to such cylinder models, the cylinder models are then adapted to the object by adapting the orientation and the radius of the cylinder models according to the detected object points.

According to the invention a cylinder model based boundary response is directly incorporated as a priority function during region growing leading to an increased accuracy of the segmentation. After completely extracting the path it is then possible to refine the models by combining all the models to create a single deformable model for the selected vessel segment, ant then to refine its surface, particularly by using a mesh on the surface and adapting the mesh to the object using a known method.

Preferably, the path is recovered from all selected points of the selected region by following said points in the order in which they were added to the selected region.

BRIEF DESCRIPTION OF THE DRAWINGS

The invention may take form in various components and arrangements of components, and in various steps and arrangements of steps. The drawings are only for purposes of illustrating the preferred embodiments and are not to be construed as limiting the invention.

DETAILED DESCRIPTION

Figure 1:
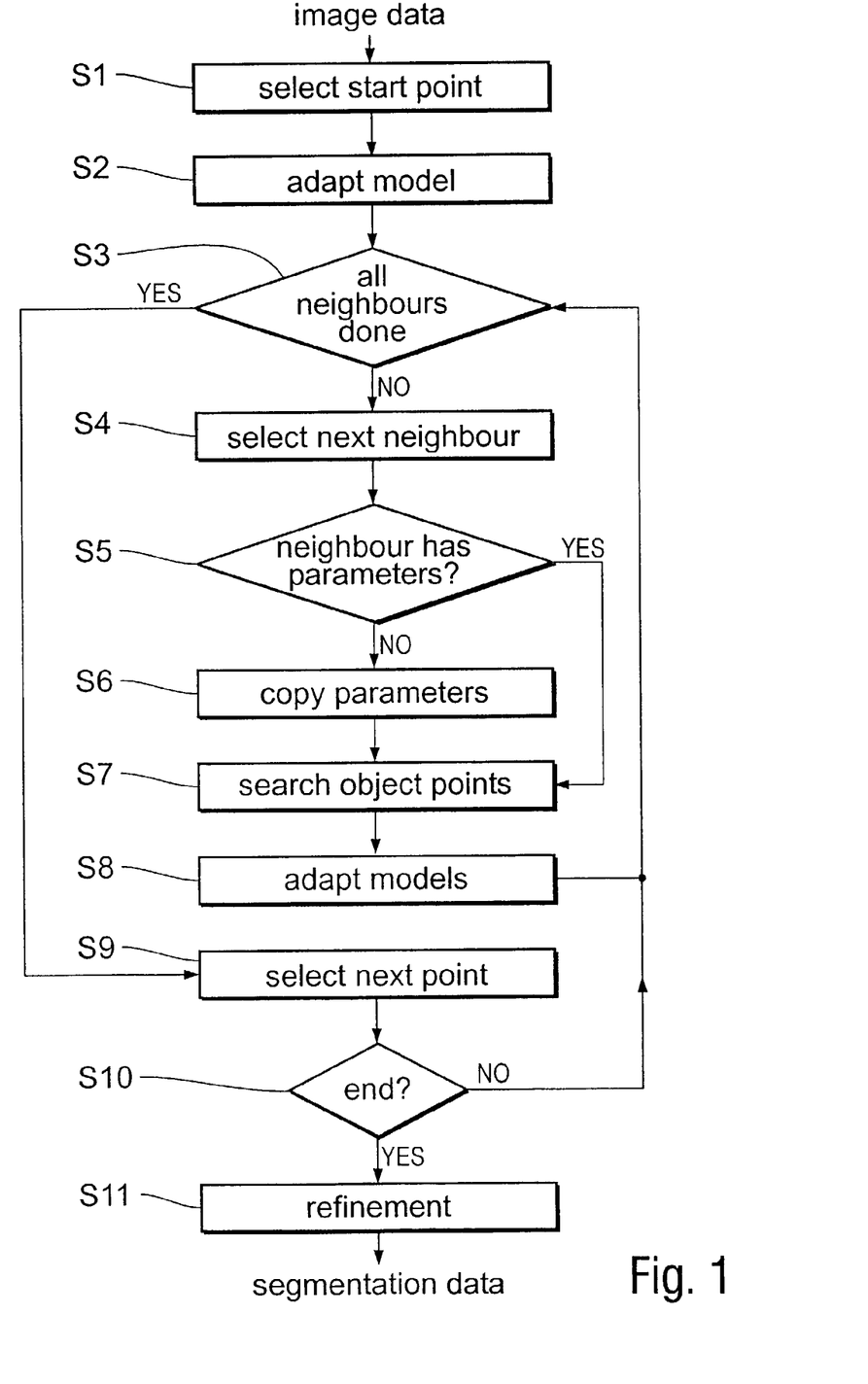
FIG. 1 shows a flow-chart of a preferred method.

The flow-chart shown in FIG. 1 illustrates the main steps of the preferred method for segmentation. In a first step S1 the user selects a start point for a path along the object to be segmented thereby also indicating the object that is to be segmented. Said start point is used as first active point in the selected region. In a second step S2 an adaptable model, e.g. an adaptable geometric primitive cylinder model with adaptable radius and orientation, is arranged around the start point and is adapted to the object. For adaptation object points, often also referred to as feature points, are searched for around the start point so that the model fits as good as possible to the local intensity distribution.

In order to find the next point of the selected region an iterative algorithm comprising several steps S3–S11 is performed.

In a recursion comprising steps S3 to S10 a model shall be adapted to each neighboring point of the first active point. The first step S3 of said recursion checks if the recursion is finished, i.e. if a model has been adapted for all neighboring points of the first active point. If this is the case a jump is made to step S9 where from all said neighboring points the next point of the selected region is selected. If not yet all neighboring points are done in step S4 the next neighboring point is selected to which a model shall be adapted. Thereafter, in step S5, it is checked if said selected neighboring point has already geometric parameters for arranging a model around it or not. If the neighboring point has already parameters a jump is made to step S7 while in the other case the parameters of the adapted model of the first active section, i.e. of the section around the start point (the first active point) are copied to the present neighboring point. When using a cylinder said model is characterized by its length, its radius and its axial orientation. Around a neighboring point thus an identical model is arranged using the parameters copied from the active point.

In step S7 the closest object points are searched for the present neighboring point. Based on the found object points a model arranged around the neighboring point in step S6 is now adapted to the found object points, i.e. the size and orientation of said model is adapted such that it fits as well as possible to the object points found for the present neighboring point (step S8). In order to repeat these steps for all neighboring points of the present active point the algorithm jumps back to step S3.

If for all neighboring points a model has been adapted such that each neighboring point has an individual model, the neighboring point is selected as next point of the selection region based on said individual models which fits best to the object (step S9). The selected neighboring point is then used as next active point, and the section around said neighboring point will be used as next active section if—after a negative result of the decision in step S10—the algorithm continues with step S3 in order to find the successive next point in the selected region.

If an end point has been reached or if a predetermined number of iterations of said recursive algorithm has been made the query of step S10 gives a positive result so that the method for segmentation continues with a final step S11 in which all points in the selected region can be combined in the order they have been found thus giving the path along the object. All adapted models of said points can then be combined and refined using a mesh on the surface of said models, particularly a triangular mesh which can be more closely refined to the object using a known method. The obtained segmentation data may then be used to suppress the object from a maximum intensity projection obtained from a 3D image data set if the object occludes any other information included in the 3D image data set but not visible in the maximum intensity projection.

The method according to the invention can be implemented such that after selection of an object of interest the object is segmented and suppressed automatically. Compared to known methods using multi-scale filtering the method according to the invention achieves an increased accuracy during segmentation so that a final image has a higher image quality, and the probability that the object is incorrectly segmented is considerably reduced.

Particular steps of the method according to the invention will now be illustrated by use of a particular example showing vessel segmentation in maximum intensity projections for magnetic resonance angiography using cylinder models. Since arteries and veins are often fully or partially occluded in a maximum intensity projection image it is often required to select either of them for segmentation in order to suppress it from the projection image. Typically, stenosis occurs in the arteries so that veins should be segmented and suppressed. The main steps will be hereinafter explained.

Figure 2A:
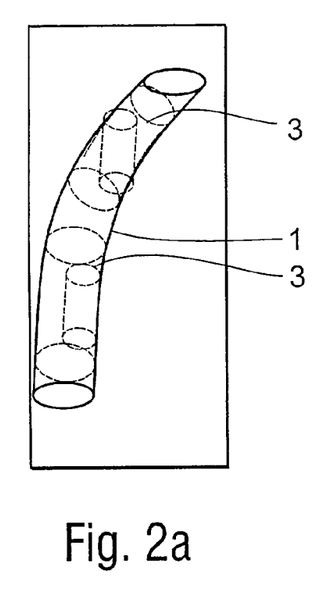
FIG. 2 illustrates the main steps of the method.
Figure 2B:
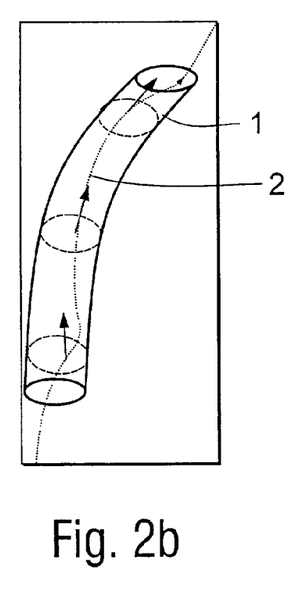
Figure 2C:
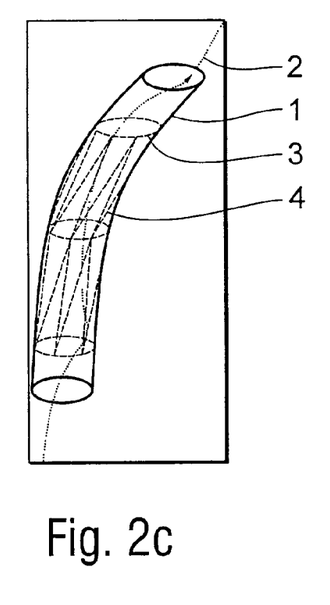

FIG. 2 schematically illustrates the main steps of the method for segmentation according to the invention. FIG. 2a shows how adaptable cylinder models 3 are adapted within the vessel 1 according to boundaries of the vessel 1 (the object). After a series of such adaptations, the points with the best fitting models may be extracted to obtain the path 2, together with associated radius and orientation estimates. This is illustrated in FIG. 2b. FIG. 2c shows a mesh 4 constructed using the information from the cylinder models 3 which may be deformed to refine the final segmentation. This is done after the path 2 has been completely extracted and all cylinder models 3 have been found and adapted to the object 1, in order to even more adapt the cylinder models 3 to the object. As a result, segmentation data for the object 1 are obtained.

Figure 3:
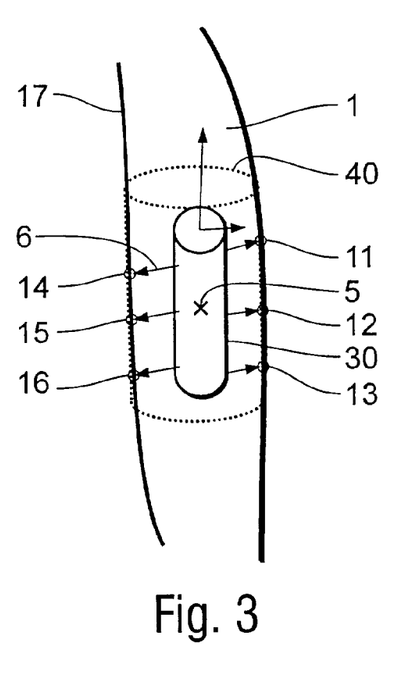
FIG. 3 shows cylinder model adaptation.

FIG. 3 illustrates the adaptation of a cylinder model 3. Assuming that there is a start point 5 selected within the tubular object 1, i.e. within the vessel 1, an initial cylinder model 30 arranged around said start point 5 (first active point) in the start section is adapted to the boundary 17 of said vessel 1. The length, radius and orientation of the adapted cylinder model 40 is found by searching object points 11–16 starting from the initial cylinder model 30 by searching along the normals 6 on the surface of said cylinder model 30. Object points 11–16 are particularly characterized by a significant increase in the gradients of the image values, i.e. the grey values of an image data set, compared to the gradients of the tissue inside or outside the boundaries 17 of the vessel 1. When such object points 11–16 are found, the initial cylinder model 30 is adapted to fit as good as possible with such object points 11–16 resulting in the adapted cylinder model 40. Such adaptation step is thereafter also used during the recursive algorithm in order to find the next points in the selected region.

Figure 4:
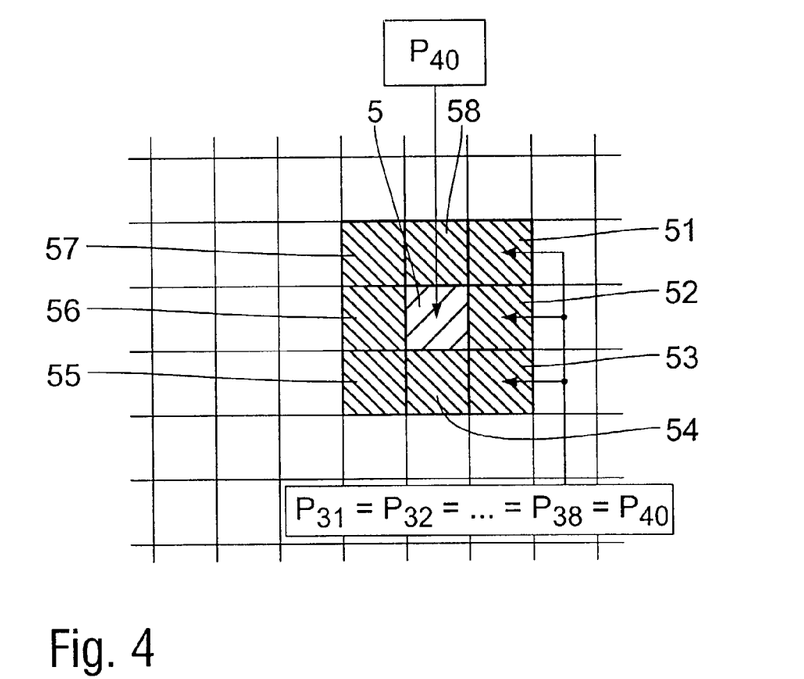
FIG. 4 shows a first step of prioritized region growing.
Figure 5:
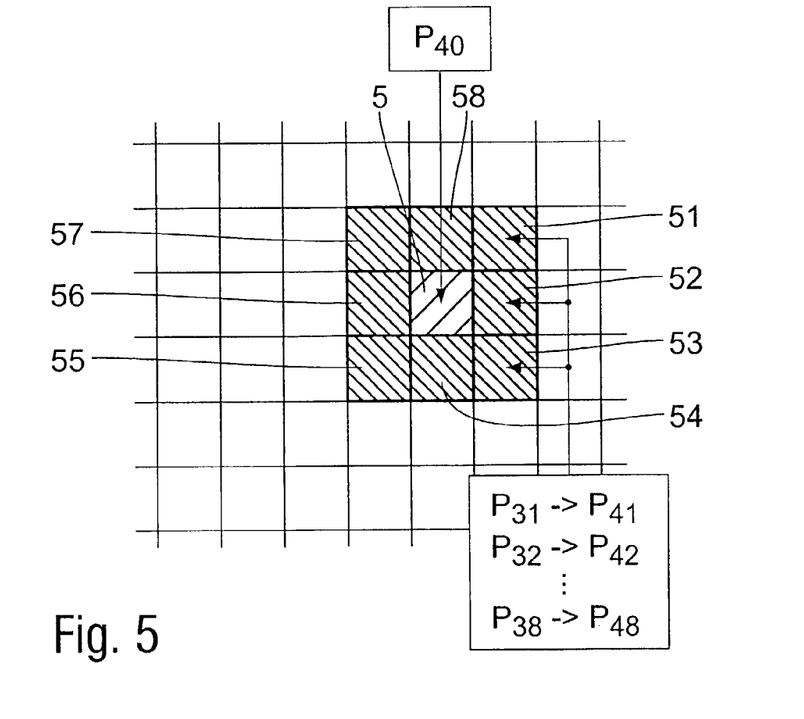
FIG. 5 shows another step of prioritized region growing.
Figure 6:
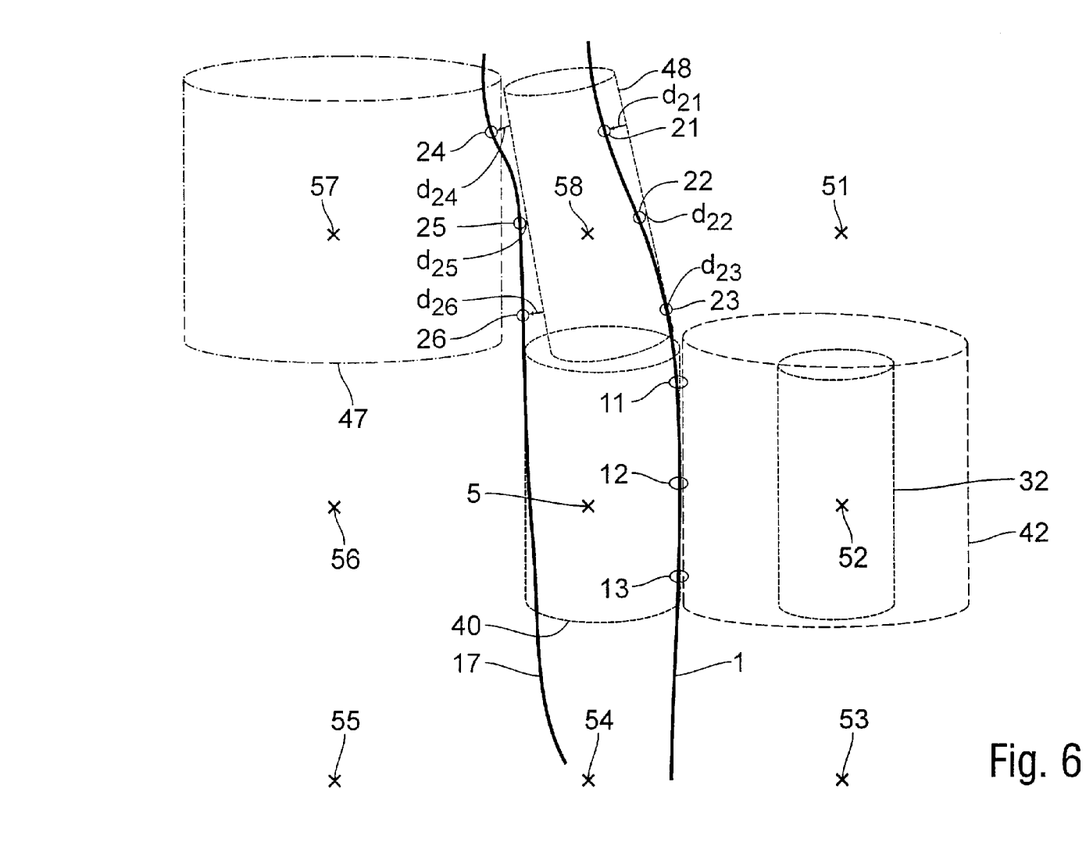
FIG. 6 illustrates a step of finding the next point of the path.

In FIGS. 4–6 the steps for finding the next point in the selected region (steps S3–S9 in FIG. 1) shall be illustrated in 2D for illustration only, while in reality the cylinder is fitted in 3D. Starting from a start point 5 for which an adapted cylinder model 40 has already been found having a parameter set $P_{40}$ one of the neighboring points 51–58 has to be selected as next point of the path. At first the parameters $P_{40}$ of the adapted cylinder model 40 are copied to all neighboring points 51–58, and around each neighboring point 51–58 an identical cylinder is arranged, i.e. the parameter sets $P_{31}$ to $P_{38}$ for cylinder models 31 to 38 (not shown) arranged around each of said neighboring points 51–58 are identical to the parameter set $P_{40}$ of the cylinder model 40 arranged around the start point 5.

In a next step shown in FIG. 5 the parameter sets $P_{31}$ to $P_{38}$ are updated into parameter sets $P_{41}$ to $P_{48}$ by transforming the original identical cylinder models 31–38 into adapted cylinder models 41–48 being adapted to the object. It should be noted that before adaptation of the cylinder models 31–38 it is required for each neighboring point 51–58 to find the closest object points so that the cylinder models 31–38 can be adapted to such object points.

FIG. 6 illustrates the steps using the example shown in FIG. 3. It should be noted that the dimensions and distances are not to scale in order to improve distinctiveness. In reality the distances between neighboring points are much smaller.

The start point 5 together with its adapted cylinder model 50 as well as all the neighboring points 51 to 58 are shown. As explained above, around each neighboring point 51–58 a cylinder model 31–38 identical to the cylinder model 40 is arranged. For simplicity's sake only one cylinder model 32 around neighboring point 52 is shown. Next, for each of said cylinder models 31–38 the closest object points of the surface 17 of the object 1 in directions orthogonal to the surfaces of the cylinder models 31–38 are searched. Using cylinder model 32 as an example it can be seen that on one side (left side in the drawing) object points 11, 12, 13 along the surface 17 of the object 1 can be found while on the other side (right side in the drawing) no object points can be found. While this will be similar for the cylinder models 31, 33, 35, 36, 37 around the neighboring points 51, 52, 53, 55, 56, 57, located outside the object 1, it will be different for the cylinder models 34, 38 arranged around the neighboring points 54 and 58, respectively, which are located inside the object 1. For those cylinder models 34, 38 in all directions perpendicular to the cylinder axis object points, e.g. objects points 21–26 for cylinder model 38 around neighboring point 58, can be found.

Next, the original cylinder models 31–38 are adapted to the object using the found object points for each cylinder model, i.e. the size and orientation of said cylinder models is changed so as to fit each cylinder model as good as possible to the found object points. This is illustrated by way of the exemplary cylinder models 42, 47 and 48. Cylinder model 42 is fit to the object points 11, 12, 13 by changing its radius and, eventually, its orientation, cylinder model 47 is adapted to the object 1 to fit as good as possible to the object points 24, 25, 26, and the cylinder model 48 is fit to the object points 21–26 by not only amending their radius but also the orientation around its neighboring point. As can immediately be seen cylinder model 48 fits best to the object 1—provided that the path to be extracted shall go into the direction of neighboring point 58 and not into the direction of neighboring point 54.

As a measure for the decision which of the adapted models 41–48 fits best with the object a distance measure is preferably used. For each of said adapted cylinder models the distances between the adapted cylinder model and the corresponding found object points in directions perpendicular to the cylinder axes are measured. Such distances, e.g. distances $d_{21}$ to $d_{26}$ for the cylinder model 48, are then used to determine a distance measure for said cylinder model, e.g. by calculating the mean square root of said distances. Since for cylinder models 41–43 and 55–57 not enough distances can be determined since not in all directions perpendicular to the cylinder axes object points can be found, a distance measure for such cylinder models cannot be calculated or is assumed to be very high so that the corresponding neighboring points 51–53 and 55–57 are automatically excluded from being one point along the path. As next point along the path the neighboring point 58 is selected which has the minimum distance measure. Thereafter, the same recursive algorithm is used to find the next point along the path from all neighboring points of the next active point 58 until an end point is reached or until a predetermined number of iterations of said recursive algorithm has been gone through.

After object point detection, cylinder parameters can be updated as follows. A new axis orientation can be determined as the mean orientation over all vectors between object points at opposite ends of the cylinder for the same radial orientation. The updated radius of the cylinder can then be calculated as the mean perpendicular distance of the object points to the updated axis.

In the particular application for segmenting a vessel as criteria for extracting points of the path inside the vessel a vesselness response for the adapted cylinder models can be defined using the residual distances between the object points and the adapted cylinder surface as well as individual feature strength leading to a speed function in which certain parameters control the sensitivity of surface evolution to the respective terms.

The described front propagation approach is well suited to selecting vessel structures where a simple local structure is repeated to form a complex pattern at larger scales. Initial orientation parameters are estimated at the start point via an exhaustive search, then propagated as voxels (in 3D image data sets) moved into a border set, and updated whenever the time is computed. A path will then be constructed between the start point and an end point by following the order in which points are added.

Figure 7:
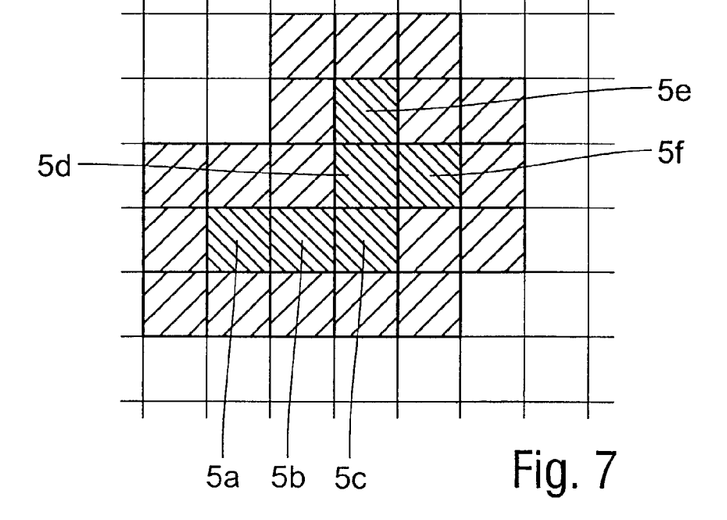
FIG. 7 shows preferred region growing.
Figure 8:
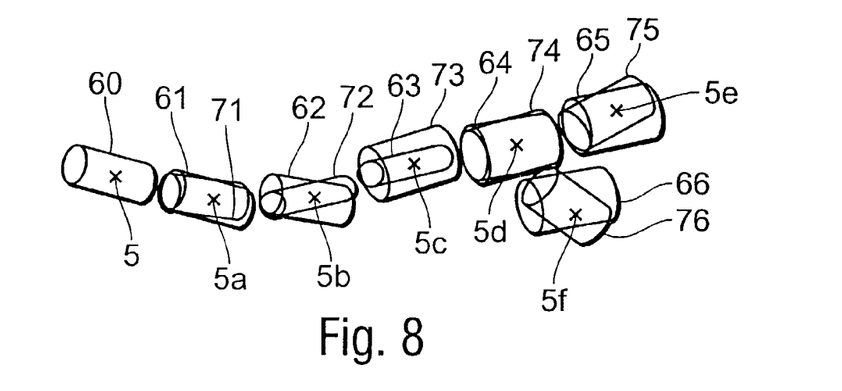
FIG. 8 shows the adaptation of cylinder models along a path.

FIG. 7 shows how several points 5a–5f are extracted to subsequently form the path along the object. FIG. 8 shows an extracted path. Around the points 5, 5a, 5b, . . . , 5f the adapted cylinder models 60, 71–76 and, for all point except the start point S, the non-adapted cylinder models 61–66 the parameters of which are copied from the cylinder model 60–64 of the respective previous point 5, 5d, are shown. It should be noted again that the object is typically much larger than the voxel spacing and that there are many more intermediate steps than those shown. However, these intermediate steps cannot be easily illustrated, since the individual cylinders of neighboring voxels overlap significantly.

The centerline extracted via a prioritized region growing is used to reconstruct the vessel volume. If a cylinder-based speed function is used, orientation and radius estimates are available directly, otherwise cylinder models may be oriented along the path adapted to retrieve these estimates. However, a vessel's cross sectional profile often deviates from circular. Visualization applications require accurate detection of the vessel wall, in order to avoid residual regions appearing in maximum intensity projections. Therefore, preferably a deformable model is constructed using the centerline and radius estimates, which can be adapted to refine the segmentation.

The vessel boundary estimate can, for instance, be represented using a triangulated mesh, which is adapted according to image features while also imposing shape based constraints on the deformation. The mesh is formed by placing a set of disks at discrete steps along the path. The radius and orientation of each disk are determined as the average of values of the available estimates for all points within the neighborhood of the disk. A set of points around the circumference of each disk is then used to define the triangulated mesh.

The chosen mesh adaptation method maintains the underlying triangle structure and uses the initializing configuration as a guiding shape model to avoid excessive deformation. Adaptation is an iterative procedure consisting of a surface detection, similar to the object point detection described above, followed by minimization of an energy function. The energy is composed of an external, image-related energy and an internal, shape-related term wherein the relative influence of each term is weighted. The external energy attracts the mesh towards the surface points. The internal energy is defined with respect to changes of the difference vectors between neighboring mesh vertices, penalizing large deviations from the initial shape. Energy minimization uses the conjugate gradients method.

Figure 9:
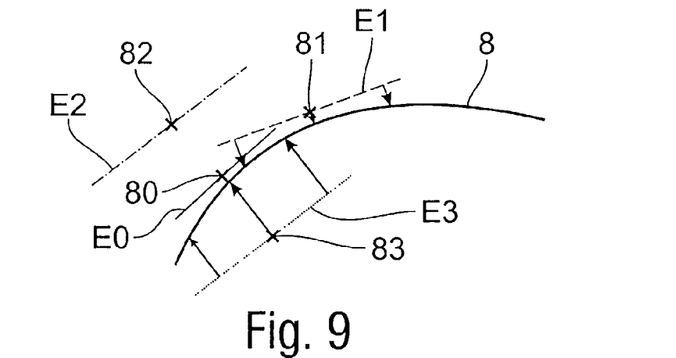
FIG. 9 illustrates the use of the method for segmentation of a surface.

The technique can also be applied for segmentation of a surface 8. This is illustrated in FIG. 9. Therein planes E0–E3, shown schematically in 2D cross-section for simplicity, are used as models to be adapted to the surface 8. Starting from a start point 80 for which a plane E0 is adapted to the surface 8 the parameters of the plane E0 are copied to all neighboring points 81, 82, 83 through which identical planes (not shown) are arranged. Based on such planes the closest object points, i.e. points on the surface 8, are searched in directions perpendicular to the planes. Using the found object points the initial planes through the neighboring points 81, 82, 83 are then adapted resulting in the shown adapted planes E1, E2, E3. Based on these adapted planes E1, E2, E3 the distances between the planes and the surface 8 are then determined in directions perpendicular to the planes, and a distance measure for each neighboring point 81, 82, 83 is calculated. As can immediately be seen in FIG. 9 the neighboring point 81 will have the minimum distance measure, thus leading to the selection of neighboring point 81 as next point in the selected region and as next start point for finding the next point in the region.

Figure 10:
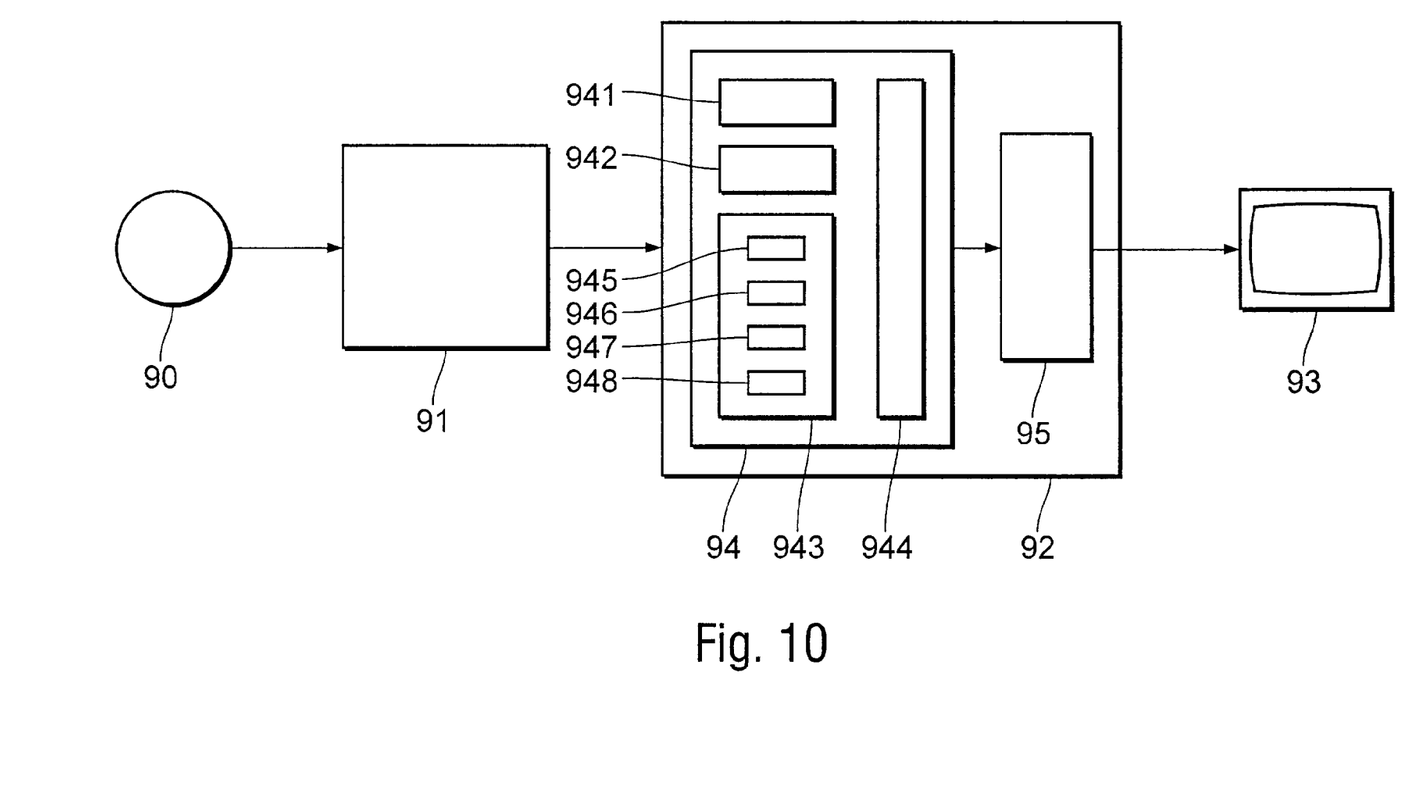
FIG. 10 shows a medical imaging apparatus.

A medical imaging apparatus including an apparatus for segmentation is shown in FIG. 10. Therein image acquisition means 91 are used for acquiring medical images of an object of interest 90, which may be a patient from which angiographic image data shall be obtained. The image acquisition means 91 may include any kind of medical imaging modality like magnetic resonance, computer tomography, x-ray or ultrasound. The acquired image data are then inputted into image processing means 92 including a segmentation unit 94 and a post-processing unit 95. The obtained image data may then be displayed on a display 93.

The method for segmentation as explained above will be performed by the segmentation unit 94. Said unit includes a start point selection unit 941 for selecting a start point of the path and a first adaptation unit 942 for adapting adaptable model to the object in a first active section around the start point. A path extracting unit 943 is thereafter used to extract all the points along the path. Said unit 943 includes a copy unit 945 for copying the geometric model parameters of the adapted model of the start section to a plurality of neighboring points of the start point, particularly those points which have no current parameters, and orienting a model around each of said neighboring points using said copied parameters, a search unit 946 for searching the closest object points around each neighboring point based on said models, a second adaptation unit 947 for adapting the models to the found object points for each neighboring point and a neighbor selection unit 948 for selecting the neighboring point for which the model fits best to the object as next point in the selected region and as next active point. In addition, control means 944 are provided for controlling the method for segmentation until an end point or a number of iterations is reached. If the extraction of the path is finished, in the post-processing unit 95 the obtained adapted models can be refined as explained above using a mesh, and the segmented object can be removed from the initial image data set, if required, in order to make objects visible in the image data set, e.g. in a maximum intensity projection, that had been occluded previously by the segmented object.

The invention has been explained by using vessel segmentation as a particular application. However, the invention is not limited to such application. The invention may also be applied to segment other objects like airways, bones or, preferable and more general, tubular objects.

The invention may further be applied for segmentation, in 2D or 3D image data sets, or other objects, via the use of other geometrical primitives, e.g. plane. In the case of the cylinder model, using the invention has been shown to provide an increased accuracy leading finally to a higher image quality and reliability.

The technique uses prioritized region growing, where selection of points to include into the region is achieved on the basis of a "goodness of fit" response for a geometrical shape primitive (or model). Each point in the region has an associated shape model. Model parameters are propagated from the selected region to other boundary points (not selected, but bordering the selected region), as initial estimates for parameters at these point, which are then updated via feature search and model fitting using the new feature points. After model fitting during the parameter update step, the "goodness of fit" measure can be obtained by comparing the fitted model and the extracted feature points.

The invention has been described with reference to the preferred embodiments. Modifications and alterations may occur to others upon reading and understanding the preceding detailed description. It is intended that the invention be constructed as including all such modifications and alterations insofar as they come within the scope of the appended claims or the equivalents thereof.

The invention claimed is:

1. A method for segmentation of an object in a 2D or 3D image data set by extracting a path along the object in a selected region, the method comprising:
    a) selecting a start point of the path as a first active point,
    b) adapting an adaptable geometric primitive surface model to the object in a first active section around the start point by adjusting geometric model parameters of the geometric primitive surface model,
    c) finding the next point of the selected region by the steps of:
        c1) copying the geometric model parameters of the adapted geometric primitive surface model of the active point to a plurality of neighboring points neighboring the active point,
        c2) orienting the geometric primitive surface model around each of said plurality of neighboring points using said copied model parameters and searching the closest object points around each of said neighboring points based on said model,
        c3) adapting the geometric primitive surface models to the found object points for each neighboring point by adjusting geometric model parameters of the geometric primitive surface model,
        c4) selecting the neighboring points for which the adapted geometric primitive surface model fits best to the object as a next point of the selected region and as a next active point, and
    d) repeating step c) until an end point of the path or a predetermined number of iterations is reached.

2. The method according to claim 1, wherein the selection in step c4) the best fit to the object is based on a distance measure of distances between the object and the model.

3. The method according to claim 1, wherein the search of the closest object points in step c2) is based on gradients of image values in a direction of a surface normal of the model in the image data set.

4. The method according to claim 1, wherein the closest object points are searched in directions perpendicular to an orientation copied to each neighboring point.

5. The method according to claim 1, wherein the method is used for segmentation of a surface using surface planes as the adaptable geometric primitive surface models to extract the path along said surface.

6. The method according to claim 1, wherein the method is used for segmentation of tubular objects in a 3D image data set, using a 3D tubular object as the adaptable geometric primitive surface model with the geometric model parameters including at least length radius, and axial orientation.

7. The method according to claim 1, wherein the method is used for segmentation of vessels in magnetic resonance angiography.

8. The method according to claim 1, further including combining the adapted models along the extracted path.

9. The method according to claim 1, wherein the path is recovered by following said next active points in the order.

10. A method for segmentation of an object in a 2D or 3D image data set by extracting a path along the object in a selected region, the method comprising:
    a) selecting a first active point of the path,
    b) adapting a cylinder model to the object in a first active section around the first active point,
    c) finding a next active point by the steps of:
        c1) copying parameters of the adapted model to a plurality of candidate points neighboring of the first active point, c2) orienting a cylindrical adaptable model around each of said plurality of candidate points using said copied parameters, c3) searching for object points around each of said candidate points based on the cylindrical adapted model around each candidate point, c4) adapting the cylindrical adaptable models around the candidate points to the found object points, c5) selecting a one of the candidate points whose adapted model fits best to the object as the next active point, and d) repeating step c) until an end point of the path or a predetermined number of iterations is reached.

11. The method according to claim 10, wherein in step c1) an orientation and radius of the adapted cylinder model is copied to the acceptable cylinder model arranged around each neighboring candidate point.

12. An apparatus for segmentation of a hollow object in a 2D or 3D image data set by extracting a path along a hollow interior of the object in a selected region, the apparatus comprising:

a) a start point selection means for selecting a start point of the path in the hollow interior as a first active point, b) a first adaptation means for adapting an adaptable geometric primitive surface model to a surface of the hollow object in a first active section around the start point, c) a path extracting means for finding a next active point, the path extracting means including:

c1) a copy means for copying geometric model parameters of the adapted geometric primitive surface model of the active point to a plurality of neighboring points which neighbor the active point, c2) a search means for orienting the adaptive geometric primitive surface model around each of said plurality of neighboring points using said copied model parameters, c3) a means for searching for closest object surface points based on the adaptive geometric primitive surface model around each of said neighboring points, c4) a second adaptation means for adapting the adaptive geometric primitive surface models for each neighboring point to object surface points found by the search means, c5) a neighbor selection means for selecting the neighboring point whose adapted geometric primitive surface model fits best as a next active point, and d) a control means for controlling the path extracting means to keep finding successive next points until an end point of the path or a predetermined number of iterations is reached.

13. An apparatus for acquiring and processing medical image data, comprising:

a means for acquiring medical image data; and the segmentation apparatus according to claim 12 for segmenting said image data.

14. A computer program product comprising computer program means for causing a computer to perform the steps of:

a) defining an adaptable geometric primitive surface model around a selected active point;

b) performing an adapting procedure to adapt the geometric primitive surface model to a neighboring section of the surface of an object to be sectioned;

c) defining a plurality of candidate next active points neighboring the selected active point;

d) defining adaptable geometric primitive surface models around the candidate next active points;

e) at each candidate next active point performing the adapting procedure for adapting the defined adaptable geometric primitive surface model to the neighboring section of the surface of the object;

f) selecting a next active point from the plurality of candidate next active points based on results of the performed adapting procedures; and g) repeating steps (c)–(f) for the selected next active point.

15. The method according to claim 1 further including using a mesh to refine the adapted geometric primitive surface models into a surface of the object.

16. The computer program product according to claim 14, wherein the object is a blood vessel and the adapting procedure includes:

fitting the adaptable geometric primitive surface model to an inner surface of the blood vessel.

17. The computer program product according to claim 14, wherein the object is a blood vessel and the adaptable geometric primitive surface model is a cylinder model.

18. The computer program product according to claim 17, wherein the adapting procedure includes adjusting a radius and orientation of the cylinder model to fit the blood vessel to be sectioned.

19. The computer program product according to claim 17, wherein the adapting procedure includes: (i) identifying object points corresponding to a surface of the blood vessel, and (ii) adjusting a radius and orientation of the cylinder model to fit the identified object points.

* * * * *